March 6, 1956 — R. C. BAKER — 2,737,248
NONROTARY THREADED COUPLING
Filed July 10, 1950 — 3 Sheets-Sheet 1
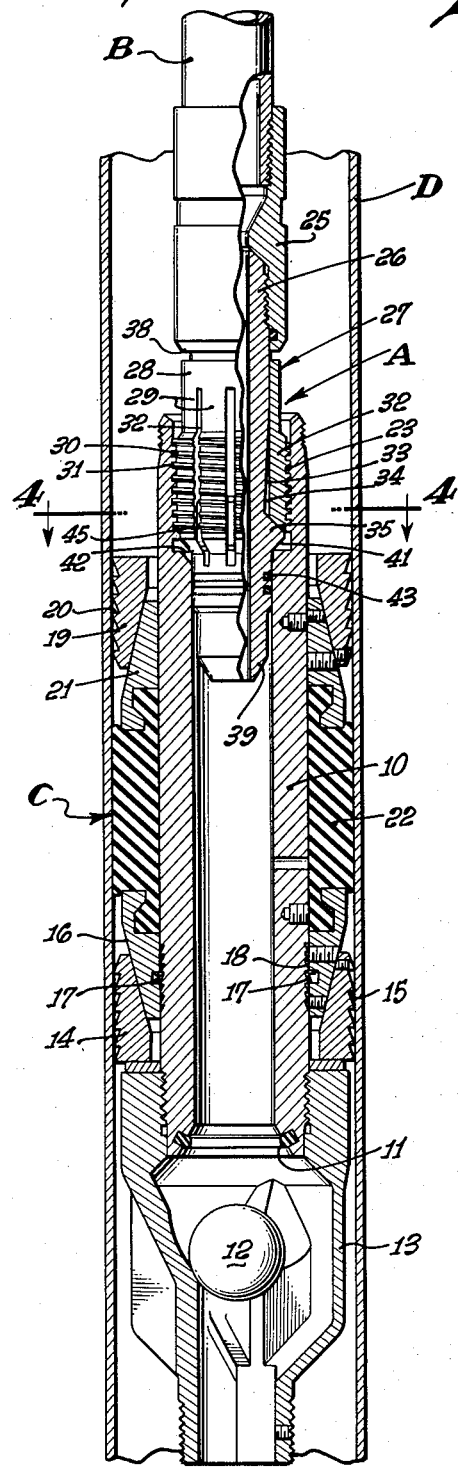
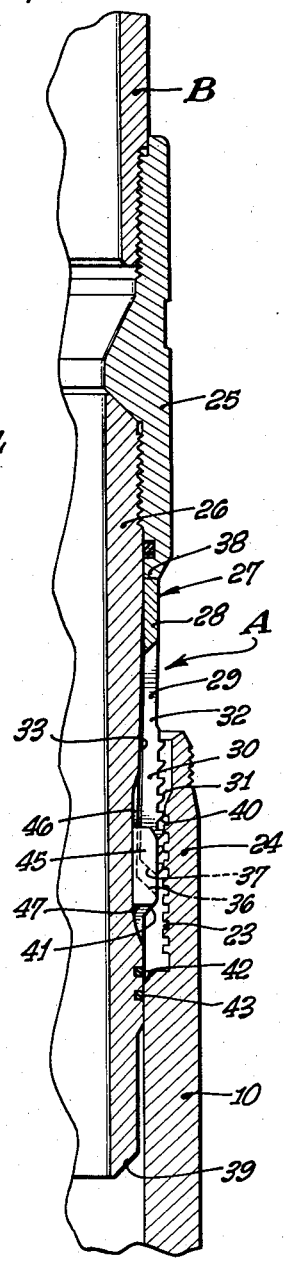
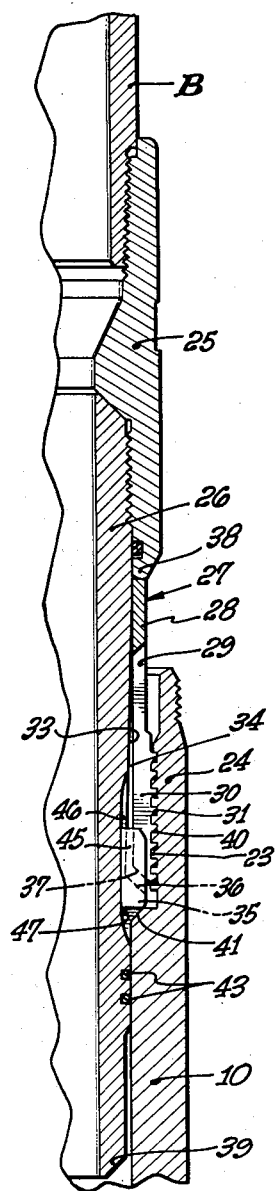
INVENTOR.
REUBEN C. BAKER,
BY
Mellin and Hanson
ATTORNEYS

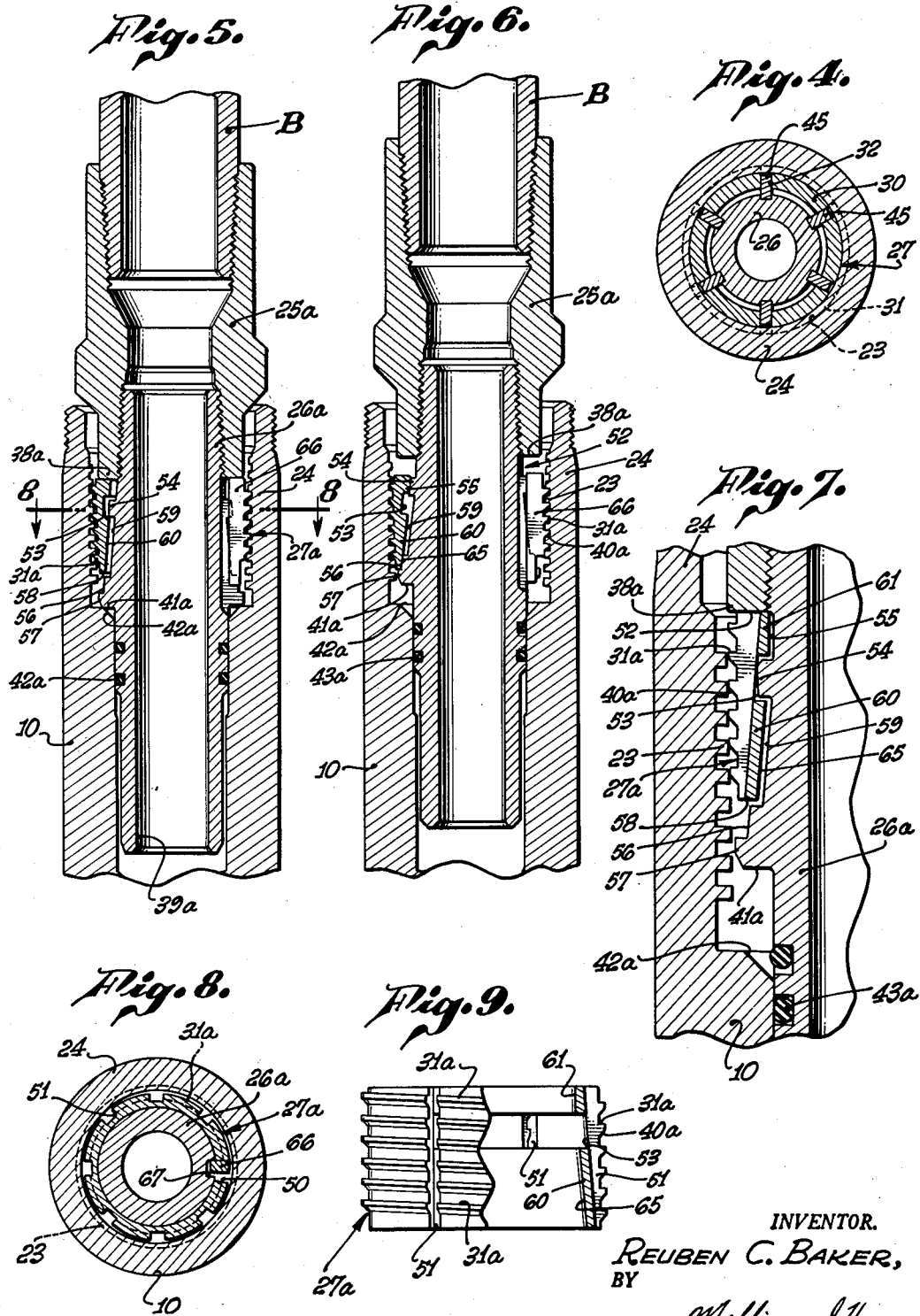

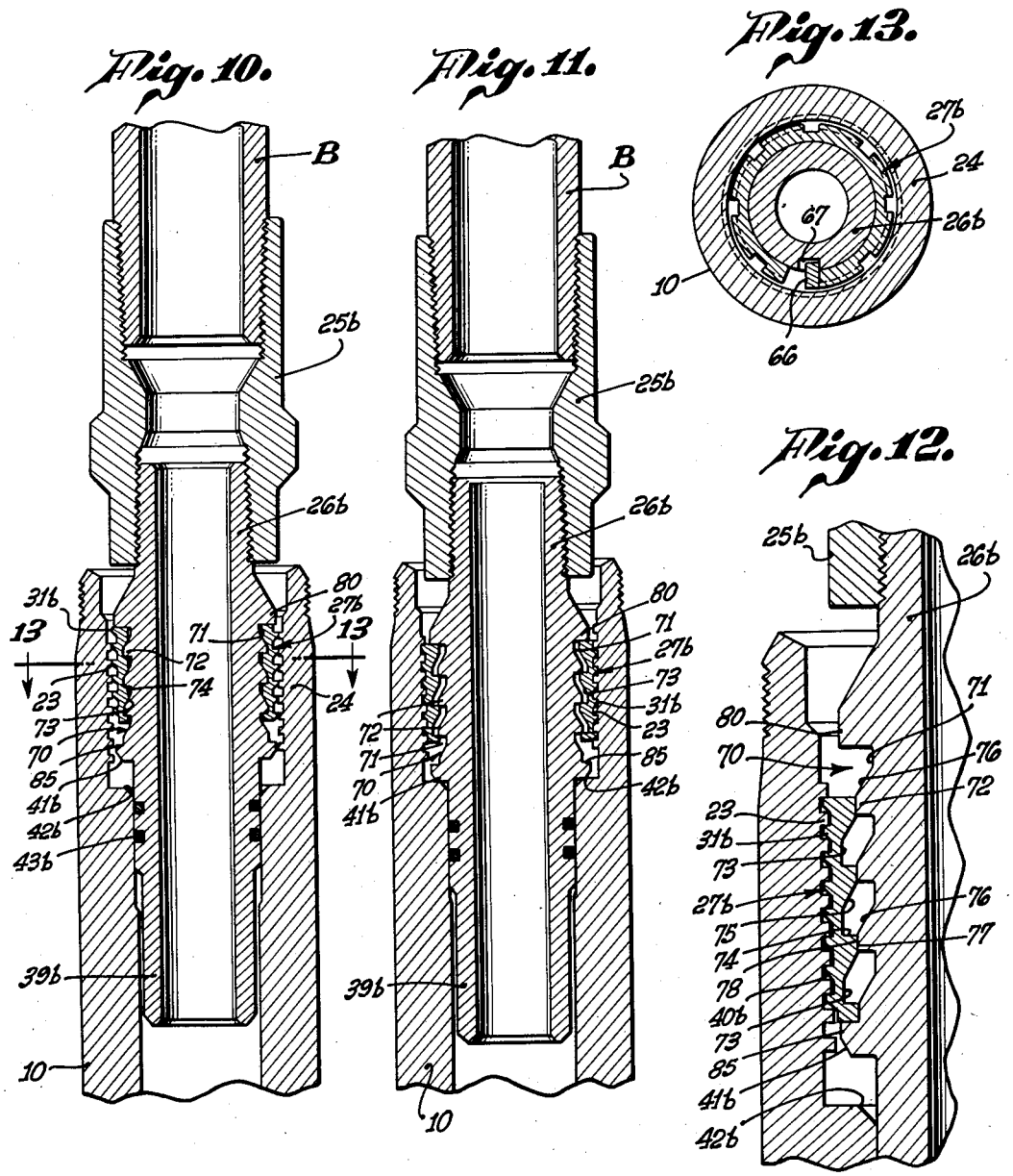

United States Patent Office 2,737,248
Patented Mar. 6, 1956

2,737,248

NONROTARY THREADED COUPLING

Reuben C. Baker, Coalinga, Calif., assignor to Baker Oil Tools, Inc., Vernon, Calif., a corporation of California Application July 10, 1950, Serial No. 172,925

5 Claims. (Cl. 166—221)

The present invention relates to coupling devices, and more particularly to devices for enabling threaded members to be threadedly connected to each other without the necessity for relatively rotating the members themselves.

The present application is a continuation-in-part of my application for "Tubing and Well Tool Coupling," Serial No. 707,664, filed November 4, 1946, now Patent No. 2,644,524.

An object of the present invention is to provide improved couplings for threadedly connecting two members together by non-rotatably moving one member longitudinally along the other member.

Another object of the invention is to provide improved couplings for threadedly connecting two members together by non-rotatably moving one member longitudinally along the other member, and in which the members can be easily unscrewed from one another.

A further object of the invention is to provide couplings for effecting a threaded connection between two members without rotating either of the members, in which the mating threads are held in mesh with each other without binding so as to facilitate subsequent unscrewing.

Yet a further object of the invention is to provide a threaded, laterally movable member and another threaded member, in which the former cannot be moved laterally beyond a predetermined extent, so as to preclude binding of the mating threads of the members against one another.

Another object of the invention is to provide a threaded connection between a laterally expansible and contractible member and another threaded member, in which unscrewing of the former from the latter is facilitated by relieving the mating force between the threads as an incident to rotation of the laterally movable member.

Yet another object of the invention is to provide a threaded connection between a laterally expansible and contractible member and another threaded member, in which the laterally movable member is maintained appropriately in mesh with the other member by being positively backed at a plurality of points along its length.

This invention possesses many other advantages, and has other objects which may be made more clearly apparent from a consideration of several forms in which it may be embodied. Such forms are shown in the drawings accompanying and forming part of the present specification. These forms will now be described in detail, illustrating the general principles of the invention; but it is to be understood that such detailed description is not to be taken in a limiting sense, since the scope of the invention is best defined by the appended claims.

Referring to the drawings:

Figure 1 is a longitudinal view, partly elevational and partly sectional, of one form of the invention illustrated in connection with a well packer anchored in packed-off condition within a well casing, and illustrating the threaded coupling effecting a full connection between a tubing string and the well packer;

Fig. 2 is an enlarged partial longitudinal view illustrating part of the threaded coupling being moved into appropriate assembly with another portion of the threaded coupling;

Fig. 3 is a view similar to Fig. 2, disclosing the mating threads of the coupling in mesh;

Fig. 4 is a cross-section taken along the line 4—4 on Fig. 1;

Fig. 5 is a longitudinal section through another embodiment of the invention, illustrating one member of a threaded coupling being moved into another threaded member of the coupling;

Fig. 6 is a view similar to Fig. 5, showing the mating parts of the threaded coupling fully meshed;

Fig. 7 is an enlarged fragmentary longitudinal section illustrating one portion of the threaded coupling being moved into another portion of the coupling;

Fig. 8 is a cross-section taken along the line 8—8 on Fig. 5;

Fig. 9 is a combined side elevational and sectional view through the threaded latch member shown in Figs. 5 to 8, inclusive;

Fig. 10 is a longitudinal section through still another embodiment of the invention, with one of the threaded members in retracted position and being moved longitudinally into a companion threaded member;

Fig. 11 is a view similar to Fig. 10, illustrating the threaded members in mesh;

Fig. 12 is an enlarged fragmentary longitudinal section illustrating the threaded members being positively held in mesh with one another;

Fig. 13 is a cross-section taken along the line 13—13 on Fig. 10.

In the form of invention illustrated in Figs. 1 to 4, inclusive, the coupling A is shown as effecting a connection between a tubular string B, of tubing or drill pipe, and a well packer C anchored in packed-off condition within a well casing D. It is to be understood, however, that the threaded coupling arrangement can be employed in connecting tubular strings to other well tools, and, for that matter, it can be used for effecting threaded connections in general wherever required.

The well packer C has been previously anchored in the well casing D in packed-off condition. As illustrated in the drawings, the packer includes a tubular body 10 having a valve seat 11 at its lower portion, against which an upwardly moving back pressure ball valve member 12 can move, in order to preclude upward flow of fluid through the body. This valve member is contained within a valve housing and abutment 13 threaded on the lower end of the body.

The well packer is prevented from moving downwardly in the well casing by a set of segmental lower slips 14 having downwardly facing wickers 15 engaging the well casing. A lower expander 16 is wedged into these slips 14, and contains a split lock ring 17 engaging suitable annular ratchet teeth 18 on the exterior of the body, to transmit any downward force imposed on the body through the lower expander 16 and lower slips 14 to the well casing C. In this manner, downward movement of the tubular body 10 is prevented.

Upward movement of the body is prevented by a set of segmental upper slips 19 having upwardly facing wickers or teeth 20 embedded in the well casing. An upper expander 21 is wedged into these upper slips. Encompassing the body 10 and connected to and between the upper and lower expanders 21, 16 is a rubber packing sleeve 22, which is compressed between the well casing C and the body 10, to preclude passage of fluid in either direction lengthwise around the exterior of the body.

The well packer A, as noted above, has been anchored in the well casing in packed-off condition, with its parts occupying the relationship shown in Fig. 1. It is desired to lower the tubular string B through the well casing C and threadedly connect it to the well packer in leakproof relation, for the performance of certain functions, such as pumping cementitious material or other fluids down through the tubular string and through the packer body 10 and the valve housing 13 into the well casing below the packer, or into the formation around the well casing. Ordinarily, a left-hand thread 23 is provided in the box or female portion 24 at the upper end of the tubular body 10, which requires a mating left-hand thread in the coupling device A attached to the lower end of the tubing string B. Such left-hand threaded connection is preferred, to enable the tubing string to be turned to the right and unthreaded from the well packer. Inasmuch as the joints of the tubing string B usually have right-hand threaded connections, such right-hand turning would tend to tighten the joints, thereby precluding inadvertent uncoupling of the tubing string at an intermediate point along its length.

While a left-hand threaded connection is desirable in effecting unscrewing of the tubing string from the well packer, it has the undesirable feature of necessitating left-hand turning of the tubing string in threadedly coupling it to the well packer, which might tend to cause one or more of the threaded joints in the tubing string to loosen, or become entirely disconnected.

Accordingly, the devices illustrating the present invention enable a threaded connection to be made between the tubing string B and the well packer C, or other tool, without the necessity for rotating the tubing string either to the left or to the right. That is, the tubing string is merely moved longitudinally and without rotation to effect a full threaded connection with the left-hand thread 23 at the upper end of the well packer C.

The coupling device A, which actually forms the lower end of the tubing string, includes a sub 25, 26 formed of two parts. An upper sub portion 25 is threaded onto an adjacent tubular section B, and is also threaded onto the upper end of a lower sub portion 26. Disposed around this latter portion is a threaded latch sleeve 27, preferably of one piece. This latch sleeve has an upper circumferentially continuous portion 28, from which legs 29 depend, that terminate in externally threaded dogs 30, which collectively have a helical male thread 31 provided on their exterior adapted to mate with the internal female thread 23 at the upper end of the packer body 10. This male thread 31, of course, is left-hand, and has the same pitch as the companion female thread 23.

One manner of forming the sleeve, with its continuous upper portion 28 and depending legs 29 and dogs 30, is to first turn its exterior to the proper diameters and then cut the left-hand thread 31 in its lower external portion. The external thread 31 conforms to the shape and diameter of the companion thread 23 on the upper end of the packer body. Thereafter, a plurality of circumferentially spaced, longitudinally extending slots 32 are cut through the sleeve from its lower end up to its upper portion 28, which remains uncut. This cutting or severing action effectively splits the sleeve and allows its depending legs 29 and dogs 30 to spring inwardly and outwardly. Normally, the dogs remain in the position that they occupy before the slots are cut, so as to properly mesh with the body box thread 23. However, the dogs and legs may be retracted sufficiently, allowing their longitudinal movement into the body without rotation.

In order to allow the dogs 30 to retract to a sufficient extent, so that their threaded portions 31 clear the thread 23 in the body, the exterior of the lower sub portion is relieved, as by forming a downward and inwardly converging portion 33, allowing a clearance space 34 into which the dogs may retract. This relieved portion 33 terminates in a retainer or expander portion 35, having a frusto-conical external surface 36 diverging in a downward direction and engaging companion surfaces 37 at the lower ends of the dogs. The distance between the tapered retainer surface 36 and a lower shoulder 38 on the upper sub portion 25 is substantially greater than the length of the sleeve 27 itself, which allows the sleeve to move longitudinally relative to the sub 25, 26, for a reason to be described below.

The tubing string B is lowered in the well casing D, with the coupling device A attached to the lower end of a tubing joint. When the upper end of the packer body 10 is reached, the forward or pilot portion 39 of the lower sub 26 enters the body 10 until the lowermost thread on the dogs 30 engages the companion thread 23 on the body box 24. Such engagement precludes, for the moment, downward movement of the threaded latch sleeve 27 into the body. However, the lower and upper sub portions 25, 26 continue to move downwardly, moving the retainer and expander portion 35 away from the lower ends 37 of the dogs, and bringing the shoulder 38 at the lower end of the upper sub portion 25 into engagement with the upper end of the sleeve 27. Such engagement enables the upper sub portion 25 to force the sleeve 27 into the body.

It is to be noted that the lower surfaces 40 of the dog threads 31 are tapered in a downward and inward direction, so as to function as cams, urging the dogs 30 inwardly when engaging the upper portions of the body thread 23. The dogs can retract inwardly, in view of the relief 34 provided behind them by the tapering of the lower sub member surface 33, and by the movement of the retainer 35 away from the lower ends 37 of the dogs. Such movement of the subs and latch sleeve into the body box is illustrated in Fig. 2, from which it is evident that the subs 25, 26 and latch sleeve 27 can be stabbed into the body box portion 24 merely as a result of longitudinal movement of the tubing string B and without its rotation. This downward movement into the packer body 10 will continue until the lower end 41 of the retainer engages a body portion 42 immediately below its thread 23, whereupon the dogs 30 can expand outwardly to their initial positions, with their collective external thread 31 in full mesh with the companion internal thread 23 in the body box. This condition is illustrated in Fig. 3.

An upward strain can now be taken on the tubing string B, which shifts the upper and lower sub portions 25, 26 in an upward direction and brings the retainer 35 against the lower tapered ends 37 of the dogs, or into the position shown in Fig. 1. So long as this strain is maintained, the dogs 30 cannot move inwardly, in view of the backing that the retainer 35 provides against them. As a matter of fact, the retainer acts as an expander, urging the dogs in an outward direction, to hold their threaded portion 31 fully meshed with the body box thread 23.

Fluent substances may now be pumped down through the tubing string B for downward passage through the body 10 and valve housing 13. Leakage between the lower sub portion 26 and body 10 may be prevented by mounting suitable side seals 43 in the lower portion of the sub, which engage the inner wall of the body.

When it is desired to disconnect the tubing string B from the well tool C, the former need merely be rotated to the right. This rotational effort or torque is transmitted to the dogs 30 of the latch sleeve 27 through a plurality of longitudinally extending keys 45, which are secured in longitudinally extending recesses 46 in the lower sub member 26, as by the aid of welding material 47. These keys extend laterally outward into the slots 32 between adjacent dogs 30, and they are engageable with the side surfaces of these dogs. As the sub 25, 26 is rotated, the turning effort is transmitted through the keys 45 to the dogs, turning them within the body box 24 and unthreading the dogs 30 and sleeve 27 in an upward direction from the latter. The holding force of the retainer 35 against the dogs is preferably relieved by lowering the tubing string B slightly, so as to avoid any binding action of the dog thread 31 against the companion body thread 23. The turning effort on the tubing string to the right is continued until the sleeve dogs 30 have been completely unscrewed from the body 10, whereupon the tubing string B, with the threaded coupling device A secured to its lower end, may be withdrawn from the well casing.

In the form of invention illustrated in Figs. 5 to 9, inclusive, the latch sleeve 27a is constituted as an integral annular member having a single longitudinal slot 50 severing it, and enabling the latch sleeve to expand and retract relative to the sub 25a, 26a on which it is mounted. In order to facilitate such expansion and contraction, for the purpose of increasing and decreasing the effective diameter of the sleeve, circumferentially spaced longitudinally extending grooves 51 may be formed in the exterior of the sleeve.

The sleeve has left-hand threads 31a on its periphery adapted to mate with the internal left-hand threads 23 in the box portion 24 of the packer body. The lower surface 40a of this thread is also tapered or inclined in a downward and inward direction. The sleeve 27a is mounted on the lower sub member 26a and fits within a circumferential groove 52 formed between the lower sub 26a and the lower shoulder 38a on the upper sub portion 25a. The sleeve has a circumferential internal groove 53 adapted to receive an annular flange 54 on the lower sub member 26a, which serves to assist in holding the sleeve in threaded engagement with the body thread 23 when engaging the inner surface 55 of the upper portion of the sleeve. The lower sub member 26a also is provided with an expander and retainer surface 56 that is inclined in an upward and inward direction, and which terminates in a lower transversely extending annular shoulder 57.

The upper and lower expander and retainer portions 54, 56 project outwardly and are spaced from one another a distance greater than the distance between the lower end 58 of the sleeve and its internal groove 53, so as to form an external groove 59 into which the lower portion 60 of the sleeve may retract, when the upper flange 54 is disposed in the internal sleeve groove 53. The parts are so proportioned and arranged that the sleeve may retract or contract on the sub 26a when the flange 54 and internal sleeve groove 53, and the circumferential sub groove 59 and lower portion 60 of the sleeve, are in alignment with each other. When the sleeve 27a is fully meshed with the thread 23 in the body box 24, the flange 54 is disposed out of the sleeve groove and the sub 25a, 26a may be elevated to locate the flange 54 opposite the upper portion 61 of the sleeve, and to locate the lower expander and retainer 56 opposite the lower portion 60 of the sleeve. The extent of upward movement of the sub 25a, 26a relative to the sleeve 27a is limited by engagement of the lower terminus 58 of the sleeve with the sub shoulder 57.

Assuming that it is desired to connect the tubing string B to the body 10 of the tool, the former, with the coupling device secured to its lower end, is lowered through the well casing until the pilot portion 39a of the sub enters the body 10 and the lowermost thread turn on the sleeve 27a engages the uppermost box thread. This latter engagement precludes downward movement of the sleeve 27a, and causes the sub 25a, 26a to move downwardly to a position in which its flange 54 is in alignment with the internal sleeve groove 53, and the sub groove 59 is in alignment with the portion 60 of the sleeve. The sub shoulder 38a then engages the upper end of the sleeve and forces it downwardly, the tapered surface 40a of the sleeve thread engaging the box thread 23, which cams or retracts the sleeve inwardly with respect to the sub. The sleeve thread 31a is thereby moved out of engagement with the box thread 23, allowing the sub 25a, 26a and sleeve 27a to be shifted downwardly and fully into the threaded box 24, to the extent limited by engagement of a shoulder 41a on the lower sub member with a stop 42a on the body below its thread (see Fig. 7).

A slight upward movement of the tubing string B and sub 25a, 26a then locates the sleeve thread 31a appropriately relative to the box thread 23, and allows the sleeve to expand outwardly inherently until its thread is in full mesh with the box thread (see Fig. 5). The sub flange 54 is then longitudinally out of alignment with the ring portion 61 thereabove, and the lower expander and retainer 56 is out of alignment with the lower end 58 of the sleeve. The tubing string B and sub 25a, 26a can then be elevated with respect to the sleeve 27a, to bring the flange 54 up behind the upper portion 61 of the sleeve, and to bring the lower expander and retainer 56 up behind the lower portion 60 of the sleeve. Such positions are definitely determined by engagement of the shoulder 57 with the lower end 58 of the sleeve. With the parts in the position just described, which is exemplified in Fig. 6, the sleeve 27a cannot retract out of full meshing engagement with the box thread 23, inasmuch as the upper flange 54 provides a firm backing against the upper portion 61 of the sleeve, and the lower expander or retainer 56 provides a solid backing against the lower portion 60 of the sleeve. In effect, a spaced, two-point support is provided, holding the sleeve outwardly with its thread 31a fully and properly meshing with the box thread 23.

The lower portion 60 of the sleeve has an internal frusto-conical surface 65 converging in an upward direction for engagement with the companion surface 56 on the lower expander and retainer. These surfaces, when engaged, tend to expand the sleeve 27a outwardly. However, the extent of such expansion is limited by engagement of the sub shoulder 57 with the lower end 58 of the sleeve, by precluding further relative longitudinal movement therebetween, and, consequently, insures that only a maximum extent of wedging of the sub 26a into the sleeve 27a can occur. Accordingly, regardless of the upward pulling force on the tubing string B, the outward expansible force on the sleeve 27a cannot exceed a predetermined amount, which is determined by the engagement of the shoulder 57 with the lower end 58 of the sleeve. Without the stop shoulder 57, or its equivalent, the upward pull on the tubing string B and sub 25a, 26a would urge the sleeve outwardly and would cause its thread 31a to be urged more firmly against the box thread 23 and other portions of the box 24.

When it is desired to release the tubing string B from the body 10, it is merely necessary to rotate the tubing string, subs 25a, 26a and sleeve 27a to the right. The forward end of the sleeve has a driving key 66 secured to it, as by welding, this key fitting within a longitudinal groove 67 in the lower sub member 26a. When the lower sub member is turned to the right, it also turns the sleeve 27a, insuring its rotation and threading in an upward direction along the box thread 23, and completely out of mesh therewith, thereby disconnecting the tubing string from the tool body.

It is to be noted that the placing of the key 66 on the forward end of the sleeve 27a, and the rotation of the sub 25a, 26a to the right causes the sub to engage the key and tend to pull the sleeve inwardly, thereby relieving its engaging force with the box thread 23, and facilitating unscrewing of the sleeve from the latter.

In the form of invention shown in Figs. 10 to 13, inclusive, the threaded sleeve 27b has the same key 66 and groove 67 connection with the lower sub member 26b. However, the sleeve is held in threaded engagement with the box thread 23 at a plurality of points along its length.

The lower sub member 26b has a peripheral groove 70 containing annular spaces 71 and intervening flanges or expander and retaining members 72. The sleeve has internal grooves 73 and annular projections or flanges 74 companion to the flanges 72 and grooves 71 on the lower sub member 26b. The lower surface 75 of each sleeve flange is tapered in an upward and inward direction to cooperate with a companion taper 76 on the upper portion of each sub flange 72. Similarly, the inner surface 77 of each sleeve flange immediately above its tapered portion 75 is cylindrical, for engagement by a companion cylindrical surface 78 depending from the tapered portion 76 of each sub flange 72.

When the sleeve flanges 75 are located opposite the circumferential grooves or recesses 71 in the sub, the sleeve 27b can retract to an extent in which its thread 31b is out of mesh with the box thread 23. When such flanges 75 are in alignment with the sub flanges 72, then the sleeve is fully meshed with the box thread.

When the tubing string B is to be connected to the body 10 of the tool, it is lowered with the coupling device attached thereto through the well casing D until the pilot portion 39b of the lower sub member enters the body 10, and the lowermost sleeve thread turn engages the uppermost box thread turn. Such engagement arrests further downward movement of the sleeve 27b, and allows the sub 25b, 26b to move downwardly until its shoulder 80, defining the upper end of the uppermost circumferential groove 71, engages the upper end of the sleeve. Continued downward movement of the sub forces the sleeve 27b down against the box thread 23, which acts upon the lower inclined sleeve thread surfaces 40b and cams or retracts the sleeve 27b, as permitted by the entry of its flanges 75 into the circumferential sub grooves 71 (see Fig. 10). The extent of retraction is sufficient to bring the sleeve thread 31b out of engagement with the box thread 23, and allows the sleeve to be pushed completely into the box as a result of longitudinal movement of the sub 25b, 26b and without its rotation. The extent of this downward or complete inward movement is limited by engagement of a lower flange 41b on the sub with a cooperable stop portion 42b on the body below its thread. Thereafter, the tubing string B and sub 25b, 26b are moved upwardly, which allows the sleeve 27b to expand inherently outward into threaded mesh with the box thread (see Fig. 11). This movement may be assisted by engagement of the tapered expander surfaces 76 on the sub with the companion internal surfaces 75 in the sleeve, until these tapered surfaces ride off one another and the cylindrical expander and retainer surfaces 78 are located behind the companion internal cylindrical surfaces 77 in the sleeve. This location of the flanges in alignment with one another is predetermined by engagement of a lower limit shoulder 85 on the sub with the lower end of the sleeve, as illustrated in Fig. 12.

Any upward pull taken on the tubing string B and the subs 25b, 26b is then transmitted from the limit shoulder 85 to the lower end of the sleeve 27b and through the sleeve thread 31b to the box thread 23. Once the limit shoulder engages the sleeve, there can be no increase in the outward expanding force of the sub 25b, 26b on the sleeve 27b, regardless of the amount of upward strain taken on the tubing string.

When the tubing string is to be disconnected from the body, it is merely necessary to rotate the tubing string B and subs to the right. Preferably, the tubing string and subs are first lowered, so as to allow the key 66 to pull the sleeve 27b slightly inwardly, and relieve any meshing force that it might have against the box thread 23. Rotation is continued until the sleeve 27b is completely unthreaded from the box, whereupon the tubing string B, sub 25b, 26b and threaded sleeve 27b may be removed to the top of the well bore.

The inventor claims:

1. In a subsurface well bore device: a running-in string for lowering the device in a well bore and including threaded joints of one hand; a first member having a thread of the opposite hand; a second member connected to the running-in string; a sleeve on said second member and having expansible and retractable threaded dogs separated completely from each other at their threaded portions and movable laterally with respect to each other; said dogs being movable laterally with respect to said second member to bring their threaded portions into threaded engagement with said first member thread, as well as out of threaded engagement with said first member thread to enable said sleeve to be moved longitudinally and without rotation along said first member thread; coengageable means on said second member and sleeve to hold said sleeve on said second member; means for moving said dogs laterally of said second member to disengage said threads; and individual rotatable driving means between said second member and each of said dogs.

2. In a subsurface well bore device: a running-in string for lowering the device in a well bore and including threaded joints of one hand; a first member having an internal thread of the opposite hand; a second member connected to the running-in string; a sleeve mounted on said second member and having externally threaded dogs adapted to threadedly mesh with said internal thread; said dogs being separated completely from each other at their threaded portions and movable laterally with respect to each other; said dogs being movable inwardly of said second member to bring the threads of said dogs out of threaded engagement with said internal thread to enable said sleeve to be moved longitudinally and without rotation along said internal thread; coengageable means on said second member and sleeve to hold said sleeve on said second member; means for moving said dogs laterally inward of said second member to disengage said threads; and individual rotatable driving means between said rotatable member and each dog.

3. In a subsurface well bore device: a running-in string for lowering the device in a well bore and including threaded joints of one hand; a first member having an internal thread of the opposite hand; a second member insertable in said first member and connected to the running-in string; a latch sleeve on said second member having a circumferentially continuous upper portion and longitudinal slots extending completely through said sleeve to define circumferentially spaced dogs completely separated from each other and depending from said upper portion and possessing a combined external thread companion to and meshable with said internal thread; coengageable means on said second member and latch sleeve to hold said latch sleeve on said second member; means for moving said dogs laterally inward of said second member to disengage said threads; and means on said second member extending into said slots to form a rotatable driving connection between said second member and dogs.

4. In a subsurface well bore device: a running-in string for lowering the device in a well bore and including threaded joints of one hand; a first member having an internal thread of the opposite hand; a second member insertable in said first member and connected to the running-in string; a latch sleeve on said second member having a circumferentially continuous upper portion and longitudinal slots extending completely through said sleeve to define circumferentially spaced dogs completely separated from each other and depending from said upper portion and possessing a combined external thread companion to and meshable with said internal thread; coengageable means on said second member and latch sleeve to hold said latch sleeve on said second member; means on said second member extending into said slots to form a rotatable driving connection between said second member and dogs; said second member being relieved adjacent the lower portion of said dogs to allow their retraction out of threaded mesh with said internal thread; and means for moving said dogs laterally inward of said second member to disengage said thread.

5. In a subsurface well bore device: a running-in string for lowering the device in a well bore and including threaded joints of one hand; a first member having an internal thread of the opposite hand; a second member insertable in said first member and connected to the running-in string; a latch sleeve on said second member having a circumferentially continuous upper portion and longitudinal slots extending completely through said sleeve to define circumferentially spaced dogs completely separated from each other and depending from said upper portion and possessing a combined external thread companion to and meshable with said internal thread; co-engageable means on said second member and latch sleeve to hold said latch sleeve on said second member; means on said second member extending into said slots to form a rotatable driving connection between said second member and dogs; said second member being relieved adjacent the lower portion of said dogs to allow their retraction out of threaded mesh with said internal thread; means for moving said dogs laterally inward of said second member to disengage said threads; and retainer means on said second member below said relieved portion engaging said dogs to hold them in threaded mesh with said internal thread.

References Cited in the file of this patent

UNITED STATES PATENTS

| | | |
|---|---|---|
| 1,111,991 | Bremer | Sept. 29, 1914 |
| 1,367,156 | McAlvay et al. | Feb. 1, 1921 |
| 1,593,909 | Nixon | July 27, 1926 |
| 1,840,187 | Davis | Jan. 5, 1932 |
| 2,228,243 | Baker | Jan. 14, 1941 |
| 2,275,935 | Baker | Mar. 10, 1942 |
| 2,378,469 | Denton | June 19, 1945 |
| 2,399,766 | Steward | May 7, 1946 |
| 2,498,791 | Clark | Feb. 28, 1950 |
| 2,570,618 | Werner | Oct. 9, 1951 |
| 2,644,524 | Baker | July 7, 1953 |

FOREIGN PATENTS

| | | |
|---|---|---|
| 628,316 | Great Britain | Aug. 26, 1949 |